US008126843B2

(12) United States Patent
McKenney et al.

(10) Patent No.: US 8,126,843 B2
(45) Date of Patent: Feb. 28, 2012

(54) CLUSTER-WIDE READ-COPY UPDATE SYSTEM AND METHOD

(75) Inventors: Paul E. McKenney, Beaverton, OR (US); Julian Satran, Atlit (IL)

(73) Assignee: International Business Machines Corporation, Armonk, NY (US)

( * ) Notice: Subject to any disclaimer, the term of this patent is extended or adjusted under 35 U.S.C. 154(b) by 1803 days.

(21) Appl. No.: 10/999,833

(22) Filed: Nov. 30, 2004

(65) Prior Publication Data

US 2006/0117072 A1   Jun. 1, 2006

(51) Int. Cl.
*G06F 17/30* (2006.01)
(52) U.S. Cl. .................................. 707/610; 707/705
(58) Field of Classification Search .............. 707/2, 201, 707/610, 705
See application file for complete search history.

(56) References Cited

U.S. PATENT DOCUMENTS 5,608,893 A    3/1997   Slingwine et al. ............ 395/468
(Continued)

*Primary Examiner* — Hosain Alam
*Assistant Examiner* — Johnese Johnson
(74) *Attorney, Agent, or Firm* — Walter W. Duft

(57) ABSTRACT

A system, method and computer program product for synchronizing updates to shared mutable data in a clustered data processing system. A data element update operation is performed at each node of the cluster while preserving a pre-update view of the shared mutable data, or an associated operational mode, on behalf of readers that may be utilizing the pre-update view. A request is made for detection of a grace period, and grace period detection processing is performed for detecting when the cluster-wide grace period has occurred. When it does, a deferred action associated with the update operation it taken, such as removal of a pre-update view of the data element or termination of an associated mode of operation.

10 Claims, 13 Drawing Sheets

U.S. PATENT DOCUMENTS

| | | | |
|---|---|---|---|
| 5,727,209 A | 3/1998 | Slingwine et al. | 395/672 |
| 6,219,690 B1 | 4/2001 | Slingwine et al. | 709/102 |
| 6,389,420 B1 | 5/2002 | Vahalia et al. | 707/8 |
| 2001/0032324 A1* | 10/2001 | Slaughter et al. | 714/4 |
| 2002/0035559 A1 | 3/2002 | Crowe et al. | 707/2 |
| 2002/0069192 A1 | 6/2002 | Aegerter | 707/1 |
| 2002/0169861 A1 | 11/2002 | Chang et al. | 709/223 |
| 2002/0178162 A1* | 11/2002 | Ulrich et al. | 707/10 |
| 2004/0024786 A1 | 2/2004 | Anderson et al. | 707/200 |

\* cited by examiner

CLUSTER-WIDE READ-COPY UPDATE SYSTEM AND METHOD

BACKGROUND OF THE INVENTION

1. Field of the Invention

The present invention relates to computer systems and methods in which common data are shared among nodes in a clustered data processing system while preserving data integrity and consistency. More particularly, the invention concerns an improved data consistency technique that does not require distributed locks or ad hoc messaging protocols and in which data read operations are able to run concurrently with data update operations without requiring locks or messages, thereby greatly improving their performance.

2. Description of the Prior Art

By way of background, a clustered data processing system represents a computational environment in which plural discrete computers (referred to as nodes) cooperate to provide a common data processing service or function. It is often the case that the nodes of a cluster cooperatively share mutable data that must remain in a consistent state throughout the cluster, yet can be manipulated locally at each node. For example, in a distributed database system, database server nodes managing a distributed pool of data storage must each maintain a consistent view of which server nodes are currently members of the cluster. It is necessary that each node be aware of state changes occurring at other nodes and that such state changes be coordinated among the nodes. By way of further example, in a distributed lock manager system, a flag can be used to indicate when a node is in a recovery mode following a node failure (and the system is attempting to recover the failed node's previous locking state). Lock requesters within the cluster that seek to acquire locks should see a consistent view of the flag, so that they are aware the recovery mode is in force and not a normal operational mode.

In the past, clustered systems have used globally mediated locks or leases to mediate access to shared mutable data. However, processes acquiring these locks or leases must incur substantial overhead. In cases where the data is rarely modified, this overhead is largely wasted. There are a number of methods of overlapping the latency of lock/lease acquisition with that of actual disk I/O (Input/Output), so-called "optimistic locking" techniques in which processes perform data updates under the assumption that any commit has a chance to fail because at least one of the data objects being committed has been changed by another process since the transaction began. In contrast, under so-called "pessimistic locking," a process explicitly obtains a lock before performing any update transaction. There are also timestamping and versioning techniques for maintaining data consistency, but these require that processes using a particular data version register in some way to prevent that version from being prematurely discarded. In all such cases, cluster-wide locking/leasing is required, even if the workload is entirely read-only. Although there are a number of techniques for caching locks, so that acquiring compatible locks does not require subsequent I/O, this still incurs the overhead of checking that the lock is still being cached.

As an alternative to lock/lease-oriented mutual exclusion, clustered data processing systems can also use message-based protocols, such as two-phase commit. The two-phase commit protocol is a distributed algorithm that lets nodes in a cluster agree to commit a transaction. The protocol results in either all nodes committing the transaction or aborting the transaction. The two-phases of the algorithm are broken into a commit_request phase and a commit phase. In the commit_ request phase, a node acting as a coordinator in connection with the transaction sends notification messages to all other nodes and waits for responses from the other nodes in which each node either agrees to the request or asserts an abort reply. In the commit phase, if all nodes have agreed to commit, the coordinator sends a commit message, following which all of the nodes commit the transaction. Otherwise, the coordinator sends an abort message.

Although message-based mutual exclusion protocols are generally effective, a major disadvantage is that they tend to be blocking. For example, in the two-phase commit protocol, a node will block while waiting for a message. This means that other processes competing for resource locks held by the blocked processes will have to wait for the locks to be released. In addition, a single node will continue to wait even if all other nodes have failed. If the coordinator fails permanently, some cohorts will never resolve their transactions.

The foregoing motivates a search for a new cluster-oriented mutual exclusion technique that overcomes the foregoing problems. What is particularly needed is an improved technique that is not burdened with the overhead of managing distributed locks or leases, and which does not require extensive message exchange with message-waiting processes blocking until responses are received.

SUMMARY OF THE INVENTION

The foregoing problems are solved and an advance in the art is obtained by a method, system and computer program product for synchronizing updates to shared mutable data in a clustered data processing system. A data element update operation is performed at each node of the cluster while preserving a pre-update view of the shared mutable data, or an associated operational mode, on behalf of readers that may be utilizing the pre-update view. A request is made (as by registering a callback) for detection of a grace period, and cluster-wide grace period detection processing is performed for determining when a cluster-wide grace period has occurred. When it does, a deferred action associated with the update operation is performed, such as deferred removal of a pre-update view of the shared mutable data, or termination of an associated mode of operation. This deferred action permits readers to omit all messaging and locking operations, which greatly improves their performance.

In exemplary embodiments of the invention, the update operation can be initially performed at an update-initiating node followed by other nodes in the clustered data processing system. In this embodiment, the update-initiating node can perform its update operation first and then advise the other nodes of the update. The update-initiating node can also be used to perform the cluster-wide grace period detection. In particular, the cluster-wide grace period detection can be performed by the update-initiating node receiving reports from other nodes in the clustered data processing system passing through local grace periods or quiescent states. Cluster-wide grace period detection could also be performed at all nodes of the clustered data processing system, such as by each node maintaining a count of nodes passing through local grace periods or quiescent states. Finally, a cluster-wide grace period can be based on all nodes in the clustered data processing system passing through a local grace period, or in the alternative, passing through a local quiescent state.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

The present invention can be implemented as an extension of a mutual exclusion technique known as read-copy update. This mutual exclusion technique is commonly used in multi-processor/single-OS (Operating System) environments, but as far as known has not been extended to operate across a cluster of computers in coordinated fashion. The read-copy update technique permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique can be used to implement data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
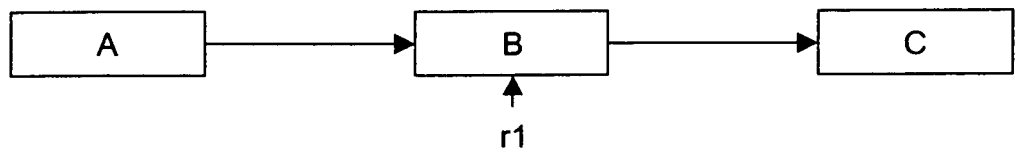
FIGS. 1A-1D are diagrammatic representations of a linked list of data elements undergoing a data element replacement according to a conventional read-copy update mechanism.
Figure 1B:
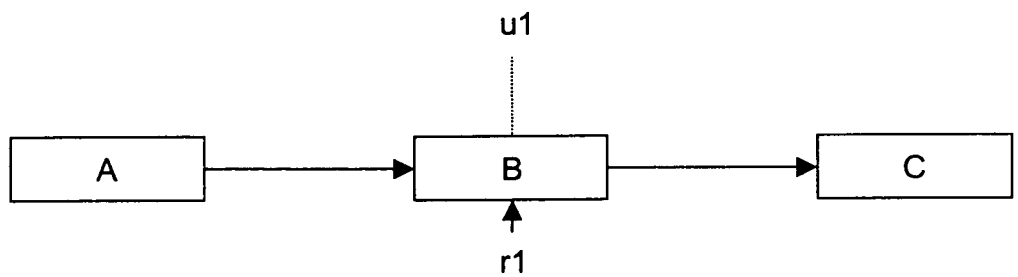
Figure 1C:
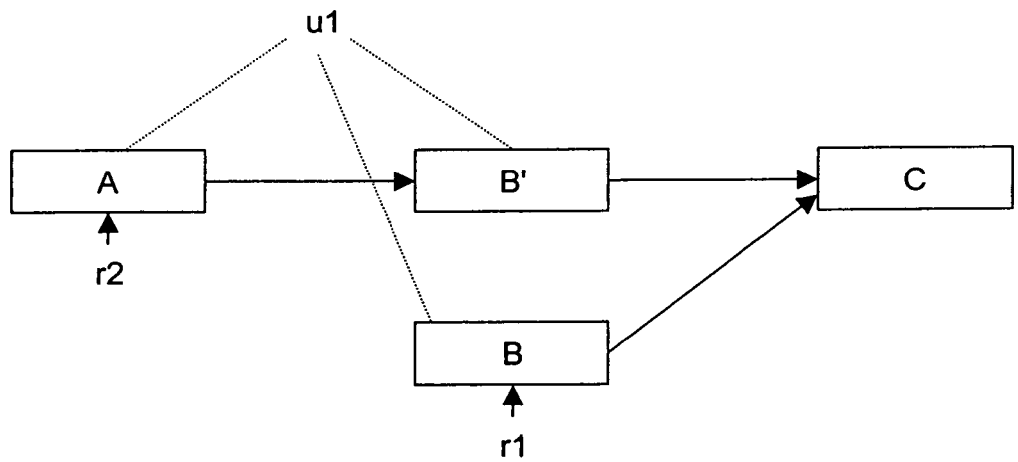

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring a spinlock, allocating new memory for B', copying the contents of B to B', modifying B' as needed, updating the pointer from A to B so that it points to B', and releasing the spinlock. All subsequent (post update) readers that traverse the linked list, such as the reader r2, will thus see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
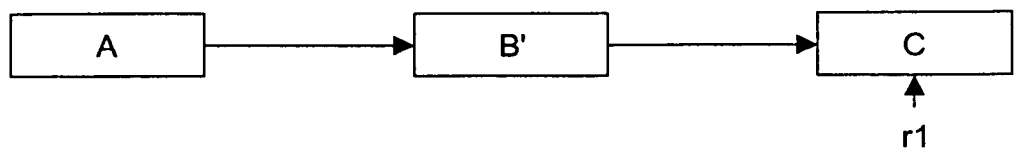

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
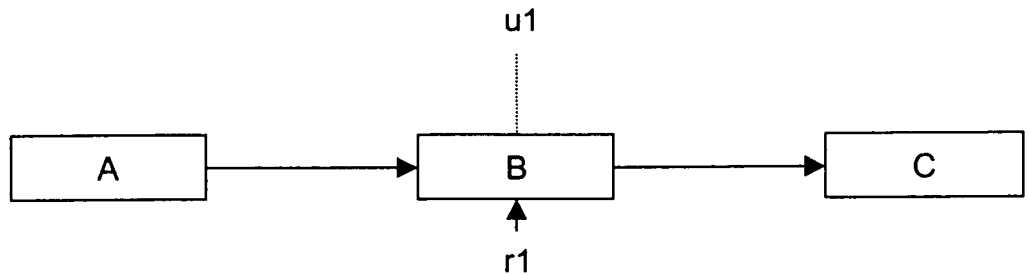
FIGS. 2A-2C are diagrammatic representations of a linked list of data elements undergoing a data element deletion according to a conventional read-copy update mechanism.
Figure 2B:
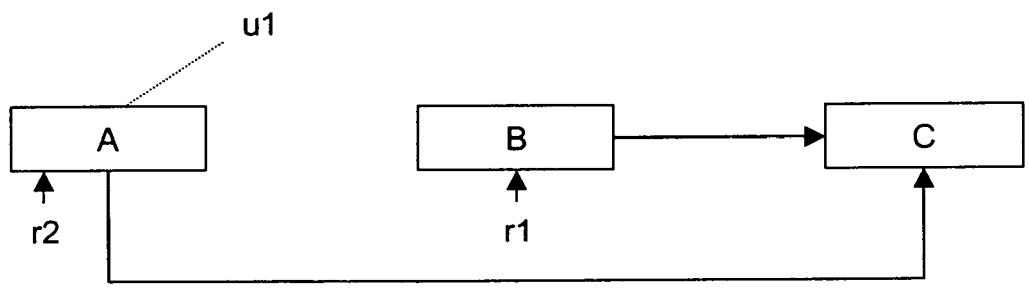
Figure 2C:
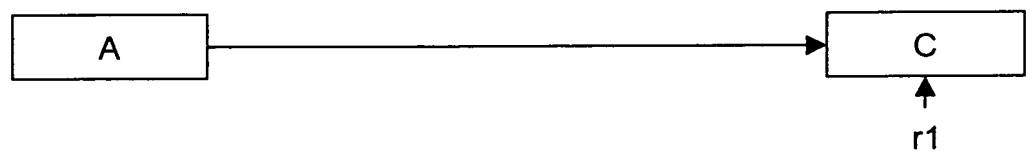

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

Of relevance to the present invention, a special use case for read-copy update exists in which a data element functions as flag or other indicator signifying a mode of operation. When an updater desires to change the mode, it can update the data element and then wait for a grace period to expire before invoking the new mode. At that point, no readers will be using an operational mode based on the old state of the data element, and the new mode can be safely implemented.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

Figure 3:
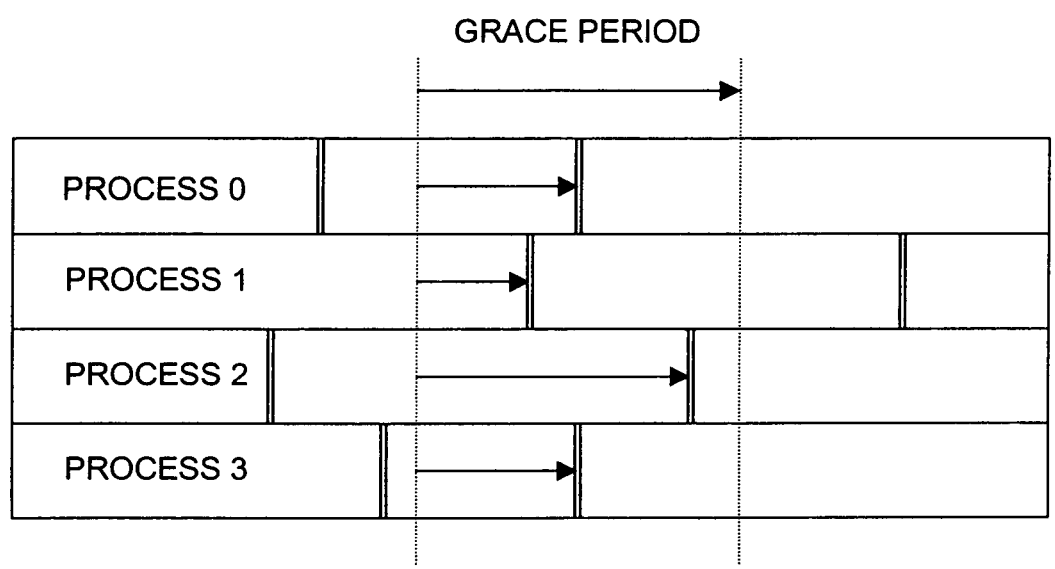
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,727,209, entitled "Apparatus And Method For Achieving Reduced Overhead Mutual-Exclusion And Maintaining Coherency In A Multiprocessor System Utilizing Execution History And Thread Monitoring." The contents of U.S. Pat. No. 5,727,209 are hereby incorporated herein by this reference.

In a typical read-copy update implementation, the callback processing technique contemplates that an updater of a shared data element will perform an initial (first phase) data update operation that creates the new view of the data being updated. The updater will then specify a callback function for performing a deferred (second phase) data update operation that removes the old view of the data being updated. The updater will register the callback function (hereinafter referred to as a callback) with a read-copy update subsystem so that it can be executed at the end of the grace period. The read-copy update subsystem keeps track of pending callbacks for each processor and monitors per-processor quiescent state activity in order to detect when a current grace period has expired. When it does, all scheduled callbacks that are ripe for processing are executed.

Callback processing can proceed in analogous fashion in the special use case discussed above where read-copy update is utilized to update a flag or other indicator signifying a mode of operation. In this case, the callback processing action taken at the end of a grace period is to notify the updater that modified the flag that the grace period has expired. The updater can then implement the new mode of operation associated with the updated flag or other indicator.

In a cluster-based data processing system, the conventional grace period processing techniques used in single-OS systems cannot be used because the notion of a grace period in a cluster of data processing nodes may be different. Moreover, the implementation of data updates is different because each node must perform its own local update operation in coordination with other nodes.

Figure 4:
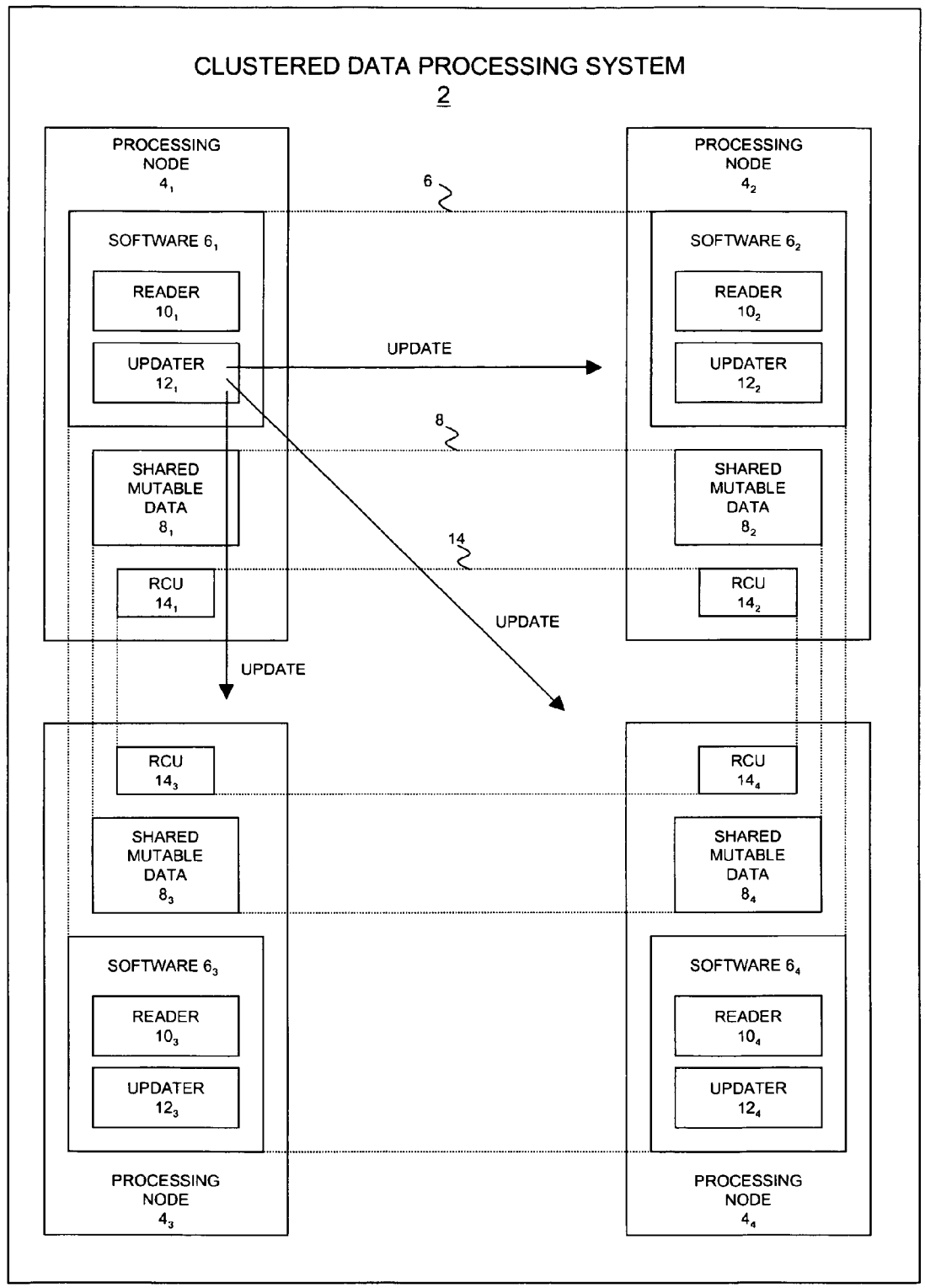
FIG. 4 is a functional block diagram showing a clustered data processing system that represents one exemplary environment in which the present invention can be implemented.

Turning now to FIG. 4, an exemplary clustered data processing system (cluster) 2 is illustrated in which an arbitrarily selected number of processing nodes is shown in correspondence with reference numerals $4_1$, $4_2$, $4_3$ and $4_4$. The processing nodes $4_1$, $4_2$, $4_3$ and $4_4$ can be implemented using any suitable computer system, depending on performance requirements, design preferences, and other factors. Although not shown in FIG. 4, each such node conventionally includes one or more processors, a program memory, a communications interface for communicating with other nodes, and optionally, a data storage system such as a magnetic or optical disk drive. Respectively executing within each processing node $4_1$, $4_2$, $4_3$ and $4_4$ is an instance $6_1$, $6_2$, $6_3$ and $6_4$ of a software application 6 whose functionality is distributed throughout the cluster 2. The software 6 is assumed to utilize a set of shared mutable data 8 that is present in the program memory at each of the processing node $4_1$, $4_2$, $4_3$ and $4_4$. In particular, each processing node $4_1$, $4_2$, $4_3$ and $4_4$ respectively maintains a copy $8_1$, $8_2$, $8_3$ and $8_4$ of the shared mutable data 8 for use by its respective software instance $6_1$, $6_2$, $6_3$ and $6_4$. Because the shared mutable data 8 is maintained at each of the processing nodes $4_1$, $4_2$, $4_3$ and $4_4$, the data must always be in a consistent state throughout the cluster 2.

Without limiting the generality of the foregoing description, one cluster-based data processing system that exemplifies the clustering features described thus far with reference to FIG. 4 is found in the IBM® TotalStorage® SAN Volume Controller product available from International Business Machines Corporation. In its current generation, the SAN Volume Controller is implemented as a cluster of four data processing nodes whose job is to virtualize a set of RAID storage devices within a SAN (Storage Area Network) on behalf of clients whose data is stored therein. The SAN Volume Controller manages the storage devices and creates virtual disk representations thereof that appear to the clients as conventional SCSI disks.

The operational integrity of the SAN Volume Controller system requires that each node maintain a consistent set of configuration data concerning the state of the managed storage devices, such as what devices exist and the state of each device. Each node further needs to maintain a consistent set of configuration data concerning the state of the cluster, such as its membership. This configuration data is periodically read by various processes, threads or other execution contexts running on the several nodes (readers) and will also be periodically updated by additional processes, threads, or other execution contexts (updaters). As such, the nodes in the SAN Volume Controller must implement a suitable cluster-based mutual exclusion protocol in order to maintain the required consistency on behalf of the readers as the updaters perform updates at the various nodes.

Another cluster-based data processing system that exemplifies the clustering features described thus far with reference to FIG. 4 would be a cluster implementing a distributed lock manager that handles requests for locks on data utilized by the processing nodes $4_1$, $4_2$, $4_3$ and $4_4$. Such a system must be capable of handling node failures so that the locking state of a failed node can be recovered. A request to acquire a lock-manager lock must be handled specially during recovery to avoid destroying data required to infer the state of individual locks that were being used by the failing node at the time of the failure. Such special handling is expensive, and therefore should be avoided during normal operation. One way to handle this situation is to use a shared data indicator (such as a flag) that signifies whether a given node is in a normal mode or a recovery mode. Using conventional mutual exclusion techniques, such a flag could be guarded by a lock. In addition, there would need to be a separate mechanism to determine when all normal-mode lock requests had finished, so that the recovery algorithm could operate with the assumption that all concurrent lock requests were using the required special processing. The lock and determination mechanism would be quite expensive, especially given that they are needed only at the time of a failure, and failures are infrequent.

Returning now to cluster configuration of FIG. 4, the shared mutable data 8 maintained at the processing nodes $4_1$, $4_2$, $4_3$ and $4_4$ will, like the configuration data in the SAN Volume Controller and the mode flag in a distributed lock manager, be periodically read by various readers and will also be periodically updated by various updaters, all of which represent processes, threads or other execution contexts associated with the distributed software 6. Reference numerals $10_1$, $10_2$, $10_3$ and $10_4$ illustrate individual data reader operations (readers) that may periodically execute on the processing nodes $4_1$, $4_2$, $4_3$ and $4_4$. Reference numerals $12_1$, $12_2$, $12_3$ and $12_4$ illustrate individual data update operations (updaters) that may periodically execute on the processing nodes $4_1$, $4_2$, $4_3$ and $4_4$. It is assumed for purposes of the present description that the read operations are performed substantially more often than updates, thus satisfying one of the premises underlying the use of read-copy update.

The updates performed by the data updaters $12_1$, $12_2$, $12_3$ and $12_4$ can include modifying, inserting or deleting any data element that comprises a portion of the shared mutable data 6. To facilitate such updates in a manner that maintains data consistency throughout the cluster 2, the several processing nodes $4_1$, $4_2$, $4_3$ and $4_4$ are programmed to implement a read-copy update (RCU) subsystem 14 by periodically executing respective read-copy update instances $14_1$, $14_2$, $14_3$ and $14_4$ as part of their operating system functions.

Figure 5:
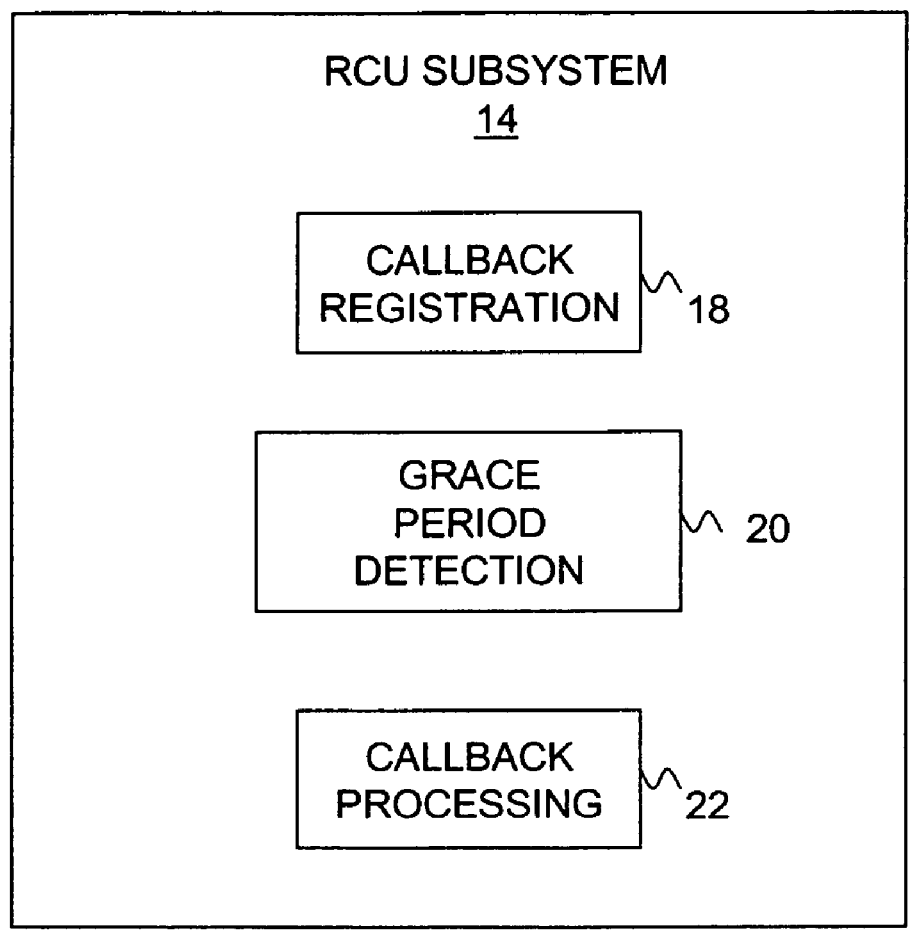
FIGS. 5 is a functional block diagram showing functional components of a read-copy update instance in the clustered data processing system of FIG. 4.

As shown in FIG. 5, the read-copy update subsystem 14 includes a callback registration component 18 as part of its functionality. The callback registration component 18 serves as an API (Application Program Interface) to the read-copy update subsystem 14 that can be called by the updaters $12_1$, $12_2$, $12_3$ and $12_4$. The updaters $12_1$, $12_2$, $12_3$ and $12_4$ use the callback registration component 18 to register requests for deferred (second phase) action (e.g., removing stale data, providing notification that a new mode of operation may proceed, etc.) following an initial (first phase) action performed by the updaters. The read-copy update subsystem 14 additionally includes a grace period detection component 20 to track grace periods, and a callback processing component 22 to perform a requested action at the end of a grace period. The functions of these components are described in more detail below.

In accordance with the present invention, when an updater, such as the updater $12_1$ of the processing node $4_1$, desires to update an element of the shared mutable data 8, it performs an update to its local copy of the data element. At the same time, the updater either preserves the old data element (e.g., where removing the old data element would adversely affect concurrent readers), or maintains an operational state associated therewith (e.g., where the data element is a flag or other indicator signifying a mode of operation), until such time as readers that may be concurrently utilizing the pre-update view of the data element pass through a quiescent state.

Figure 6A:
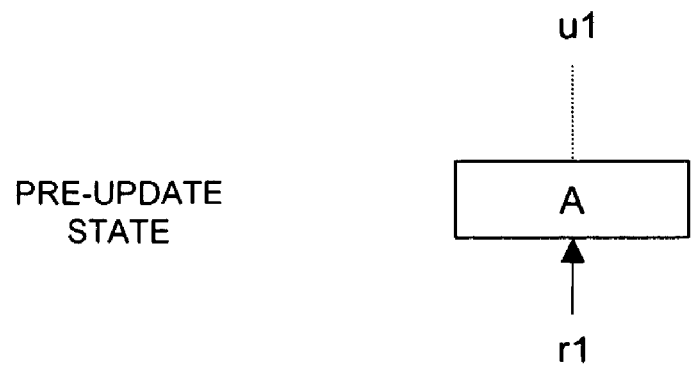
FIGS. 6A, 6B and 6C are diagrammatic representations of a data element being updated in accordance with the present invention at a single node of the clustered data processing system of FIG. 4.
Figure 6B:
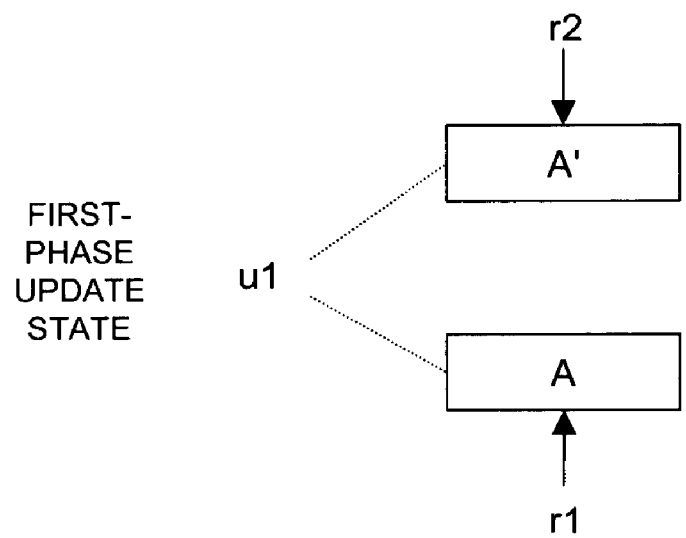
Figure 6C:

By way of example, and with reference now to FIG. 6A, if the updater $12_1$ wishes to modify a data element A that is being utilized by a reader r1, while preserving the old data element, it will first create a copy A' of the data element A that subsequent readers, such as r2, will see. As shown in FIG. 6B, the original data element A is retained for the benefit of r1, and the updater $12_1$ registers a callback with the callback registration component 18 of its read-copy update subsystem instance $14_1$, as is known in connection with conventional read-copy update processing. In addition to the foregoing, the updater $12_1$ sends an update request, containing a copy of the modified data element A', to each of the peer nodes $4_2$, $4_3$ and $4_4$, resulting in the execution of peer updaters $12_2$, $12_3$ and $12_4$. Each such peer updater $12_2$, $12_3$ and $12_4$ will install the modified data element A' for the benefit of subsequent readers, and then register a callback with the callback registration component 18 associated with each peer's read-copy update subsystem instance $14_2$, $14_3$ and $14_4$, to remove the old data element A.

Figure 7:
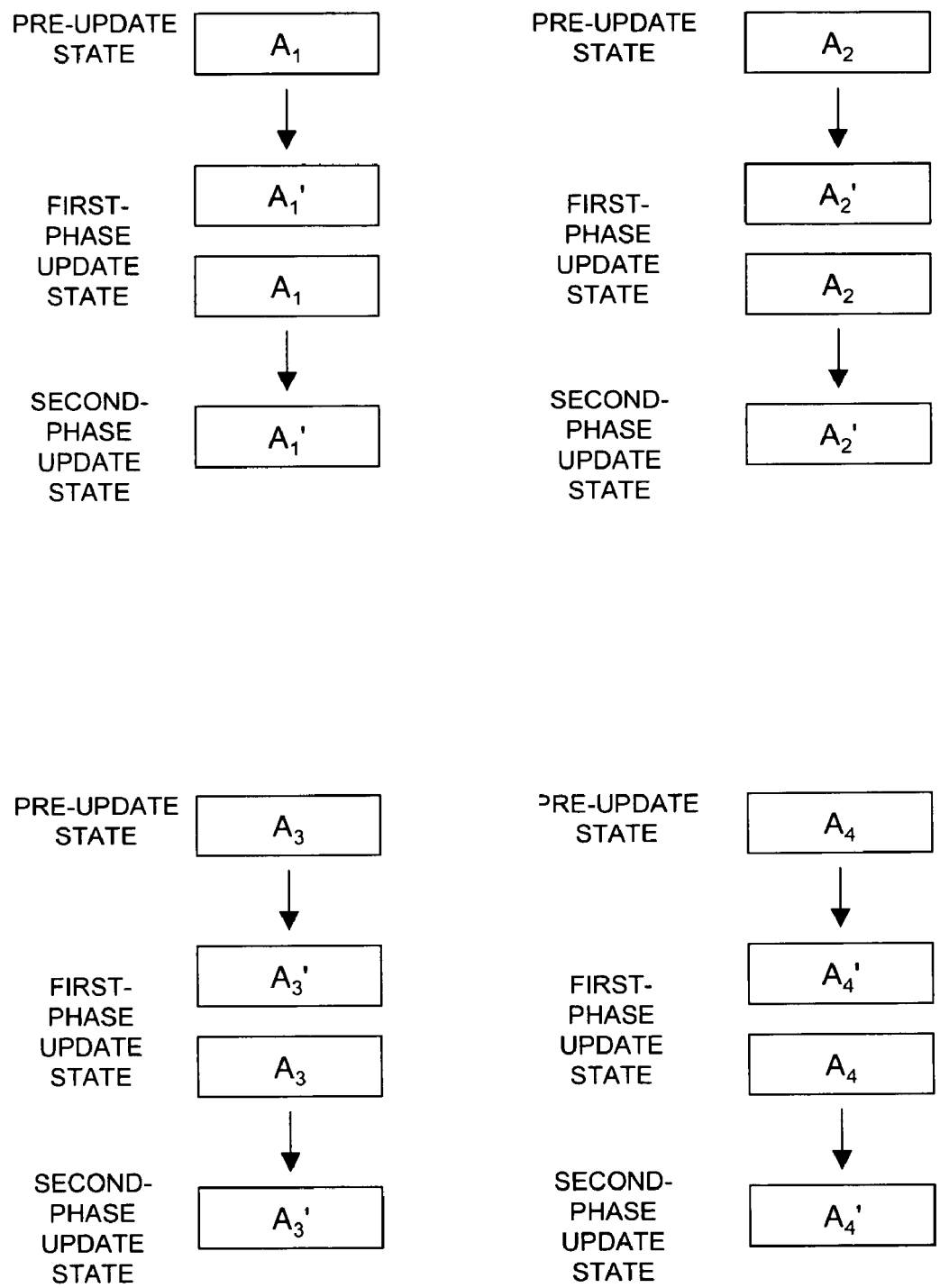
FIG. 7 is a diagrammatic representation of a data element being updated in accordance with the present invention at each node of the clustered data processing system of FIG. 4.

With a copy of the new data element A' now being present at all of the processing nodes $4_1$, $4_2$, $4_3$ and $4_4$, the grace period detection component 20 of each read-copy update subsystem instance $14_1$, $14_2$, $14_3$ and $14_4$ performs cluster-wide grace period detection functions (described in more detail below), following which the callback processing component 22 of each read-copy update subsystem instance $14_1$, $14_2$, $14_3$ and $14_4$ removes the old data element A. The entire update sequence performed at each of the processing nodes $4_1$, $4_2$, $4_3$ and $4_4$ is shown in FIG. 7. As can be seen, all of the peer updaters $12_2$, $12_3$ and $12_4$ perform the same update processing to their copies ($A_2$, $A_3$ and $A_4$) of the data element A. Data consistency, as required for example in a cluster-wide database maintaining a set of configuration data, is thus maintained at all nodes.

For updates involving the deletion of data elements, the update processing performed at the processing nodes $4_1$, $4_2$, $4_3$ and $4_4$ is similar to that described above, except that there are no modified data elements involved. The update request sent by an initiating updater would simply result in the peer updaters implementing the deletion for the benefit of subsequent readers, and then registering callbacks for removal of the deleted data element following a cluster-wide grace period. At that point, any readers that were referencing the data element when update processing commenced, wherever they are located in the cluster 2, will have removed their references to the data and will not be impacted by the deletion.

For updates involving the insertion of new data elements, no callback processing is required. The initiating updater simply needs to distribute a copy of the new data element to its peers for incorporation into each peer's shared mutable data 8.

For the case in which an updater $12_1$, $12_2$, $12_3$ and $12_4$ is updating a data element that indicates a mode of operation, such as a flag, the processing is similar to the data modification scenario of FIG. 7. However, this case will not normally require that an old copy of the mode-indicating data element be maintained. Moreover, callback processing is different insofar as its only purpose is to provide notification that a cluster-wide grace period has expired. This will signify that the new mode of operation may now be implemented. For example, in the case of a distributed lock manager system recovering from a failed node, the recovery process may safely assume as a result of cluster-wide grace period termination that all concurrent distributed-lock requests are running in recovery mode.

Figure 8:
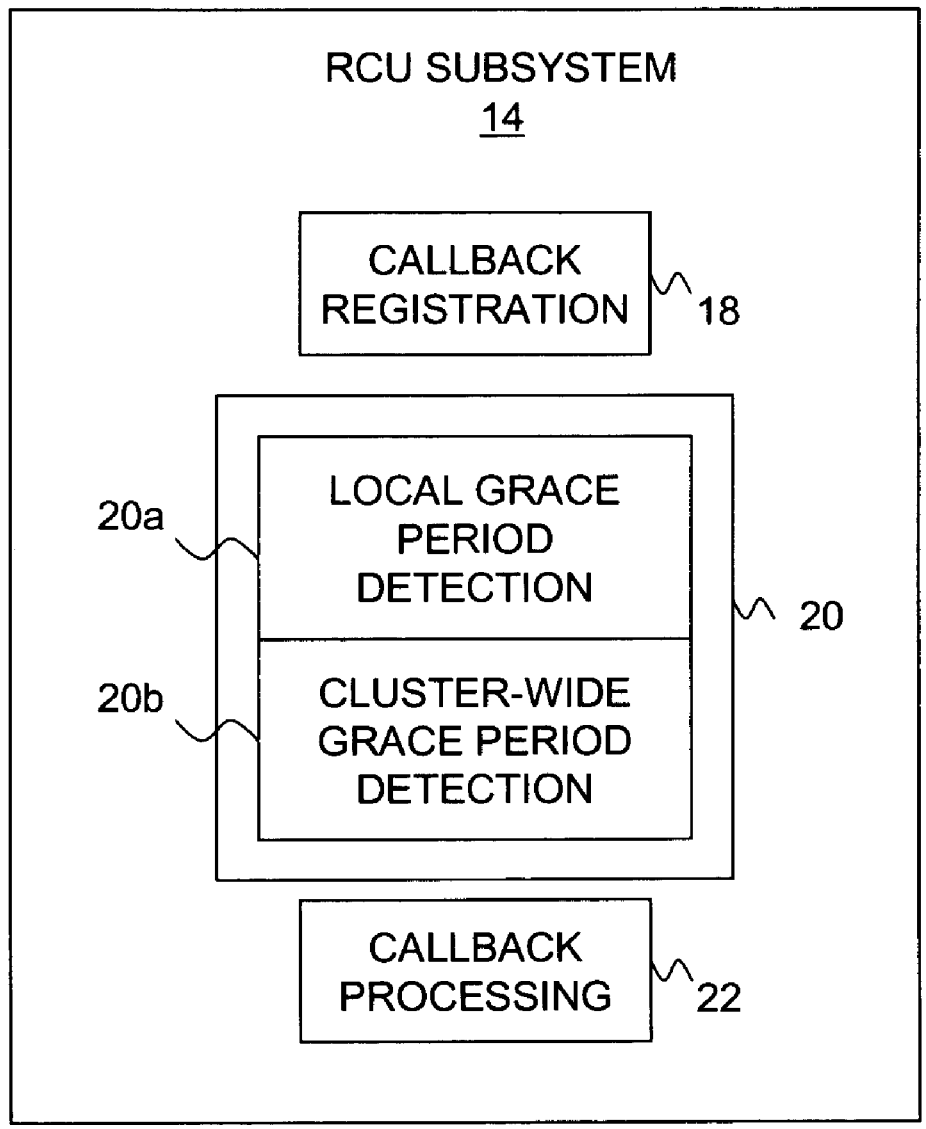
FIG. 8 is a functional block diagram showing details of the grace period processing component of FIG. 5.
Figure 9:
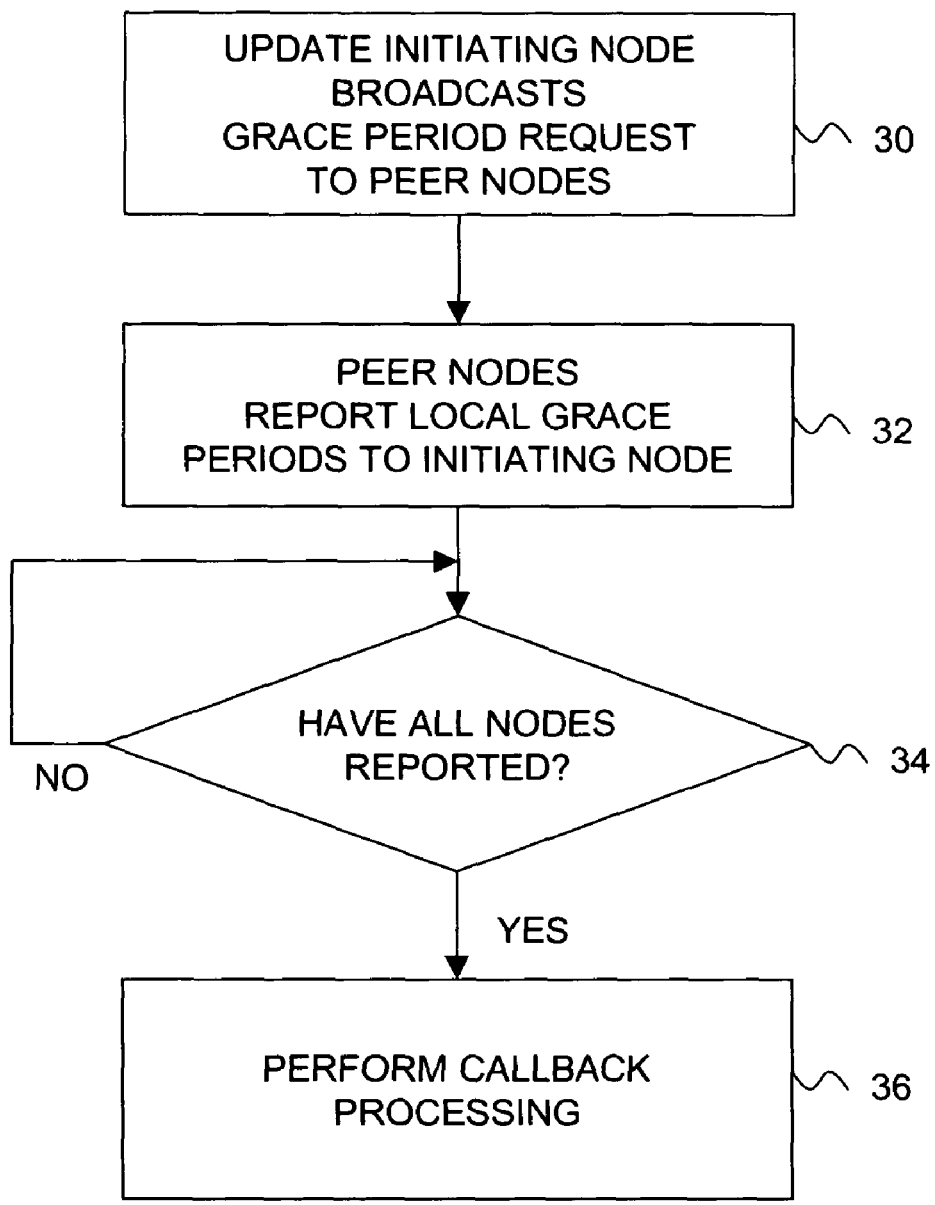
FIG. 9 is flow diagram showing exemplary cluster-wide grace period processing that may be performed in accordance with the present invention.
Figure 10:
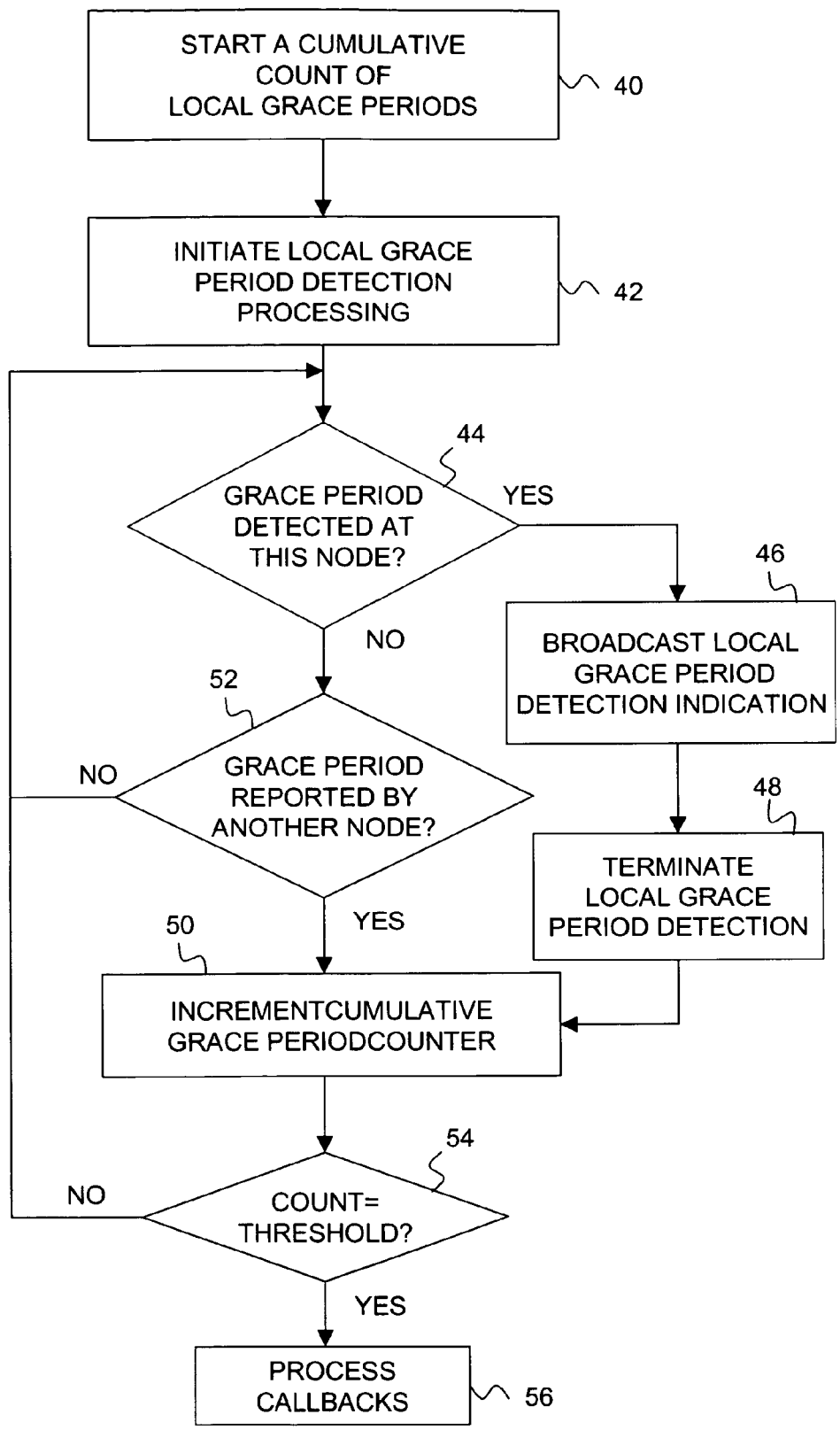
FIG. 10 is flow diagram showing an alternative example of cluster-wide grace period processing that may be performed in accordance with the present invention.

Turning now to FIG. 8, the detection of cluster-wide grace periods within the cluster 2 can be performed in several ways. One approach is to implement a cluster-wide barrier based on per-node grace periods. This implementation can be used when each of the processing nodes $4_1$, $4_2$, $4_3$ and $4_4$ already uses read-copy update processing in connection with its internal (intra-node) data and is programmed to detect periods relative to the processor(s) executing at that particular node. Assuming this local grace period detection intelligence is present at each of the processing nodes $4_1$, $4_2$, $4_3$ and $4_4$, as shown by subcomponent 20a of the grace period detection component 20 in FIG. 8, the only new intelligence that is required is a cluster-wide grace period detection subcomponent 20b. The detection of a cluster-wide grace period can proceed in several ways. FIGS. 9 and 10 illustrate two such examples. Other alternatives would no doubt also be possible.

In step 30 of FIG. 9, the cluster-wide grace period detection subcomponent 20b of one of the read-copy update subsystem instances $14_1$, $14_2$, $14_3$ and $14_4$, i.e., the one associated with the initiating updater at an initiating node, broadcasts a grace period request to the cluster-wide grace period detection subcomponent 20b in each of the other read-copy update subsystem instances associated with peer nodes. In step 32, the peer nodes begin grace period tracking (using their local grace period detection subcomponent 20a) and report to the update-initiating node when a local grace period has elapsed. When it is determined by the update-initiating node in step 34 that all peer nodes have reported a local grace period, the grace period detection subcomponent 20b of the initiating node's read-copy update instance 14 can invoke its callback processing component 22, and authorize the peer nodes to do the same, as shown by step 36.

Figure 11:
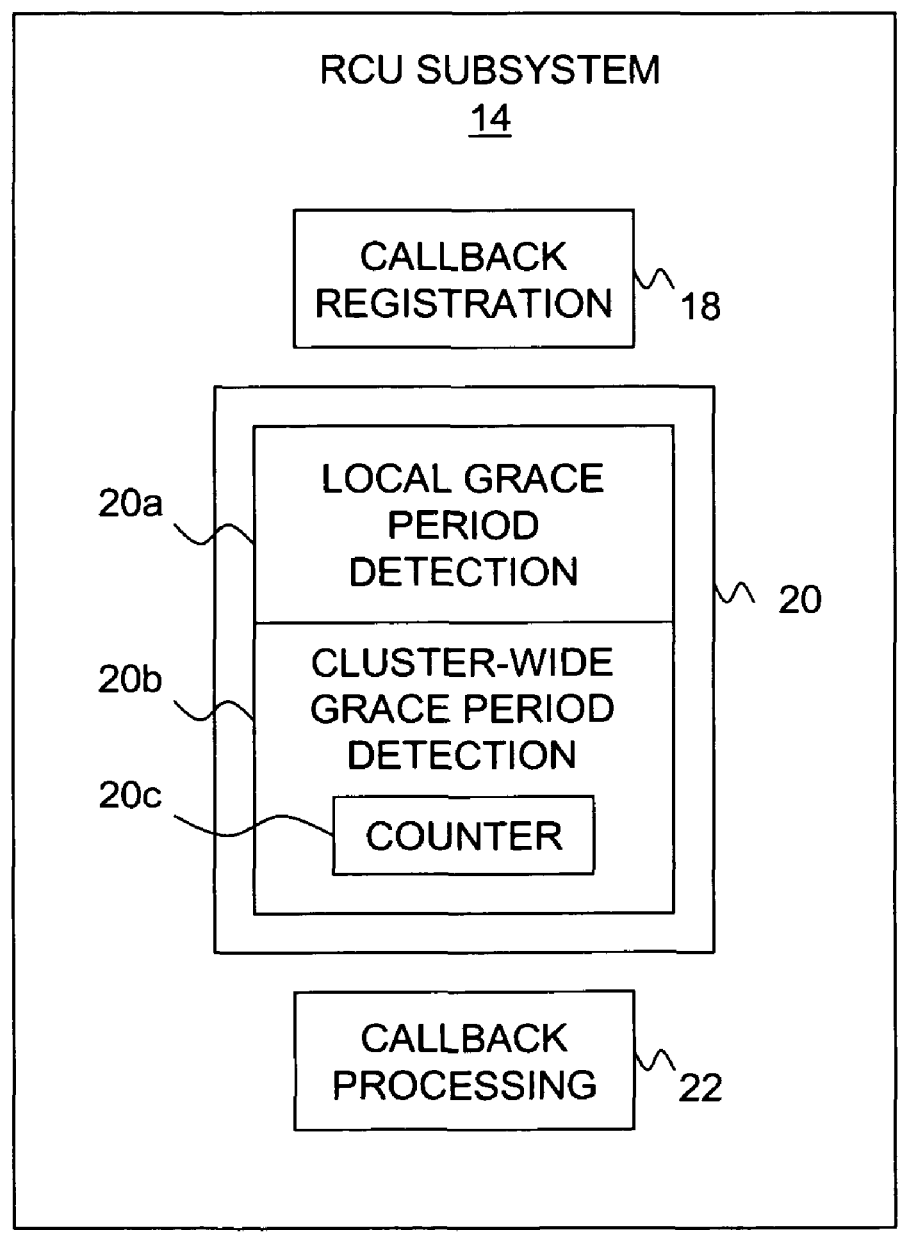
FIG. 11 is a functional block diagram showing further details of the grace period processing component of FIG. 8 according to an exemplary implementation of a cluster-wide grace period processing component.

FIG. 10 illustrates another cluster-wide grace period detection alternative in which each of the processing nodes $4_1$, $4_2$, $4_3$ and $4_4$, maintains a cumulative count of the number of grace periods that have elapsed locally at each node. FIG. 11 illustrates a corresponding exemplary implementation of the read-copy update subsystem 14 of FIG. 8 in which the cluster-wide grace period processing subcomponent 20b maintains a counter 20c that can be used to hold the cumulative count value. In step 40 of FIG. 10, the cluster-wide grace period detection component 20b in each read-copy update subsystem instance $14_1$, $14_2$, $14_3$ and $14_4$ starts the cumulative grace period count by initializing its counter 20c. In step 42, local grace period detection processing is initiated to track local grace period activity. Step 44 tests whether a local grace period has elapsed. If it has, a grace period indication is broadcast to the other nodes in step 46. This could be done in various ways, such as by piggybacking the grace period indication onto a conventional heartbeat message of the type conventionally used in clustered systems to monitor node operational viability. Following the broadcast of the grace period indication, local grace period processing is terminated in step 48 and the cumulative grace period counter 20c is incremented in step 50. If it is determined in step 44 that a local grace period has not elapsed, step 52 tests whether a local grace period has been reported by another node. If it hasn't, processing resumes at step 44. If a local grace period has been reported by another node, the cumulative grace period counter 20c is incremented in step 50. In step 54, a test is made on the counter 20c to determine whether all nodes have reported a grace period (i.e., count=number of nodes). If they have not, processing returns to step 44. If all of the nodes have reported, then in step 56 the cluster-wide grace period detection subcomponent 20b of each read-copy update instance $14_1$, $14_2$, $14_3$ and $14_4$ can invoke its callback processing component 22.

Note that in lieu of using the counter 20c to count the number of nodes that have passed through grace periods, a bitmap showing such nodes could be used for relatively small clusters. For large clusters, a combining tree could be used.

As mentioned above, the foregoing examples of grace period detection assume that each processing node $4_1$, $4_2$, $4_3$ and $4_4$ is programmed to detect local grace periods using each node's existing read-copy update subsystem $14_1$, $14_2$, $14_3$ and $14_4$. In the event such programming is not present, cluster-wide grace period detection could be based on a per-node quiescent state definition selected to ensure that no reader at a given node will be referencing a pre-update version of the node's shared mutable data 8. Specific cluster-wide applications may define their own quiescent states, resulting in an application-specific definition of a grace period. By way of example, a node's quiescent state could be based on all of its processors passing through an idle/wait state.

Figure 12:
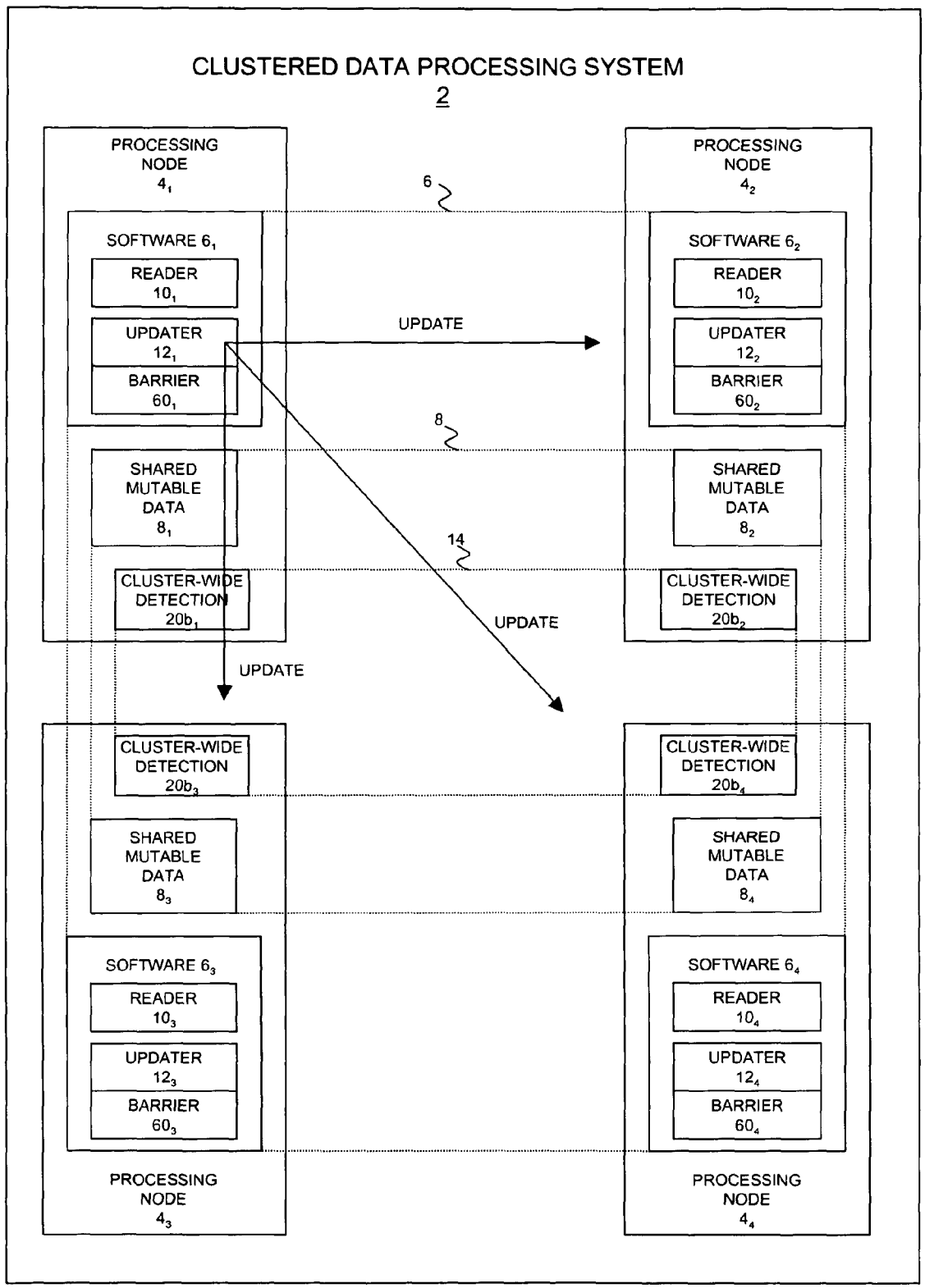
FIG. 12 is a functional block diagram showing a clustered data processing system that represents another exemplary environment in which the present invention can be implemented.

Turning now to FIG. 12, once a suitable per-node quiescent state definition is selected, a cluster-wide grace period detection subcomponent 20b, as described above, can be used to detect when a cluster-wide grace period has lapsed as a result of all nodes passing through a per-node quiescent state. Any suitable technique can be implemented, including either of the processes of FIGS. 9 and 10, but with quiescent states according to the applicable definition being used in lieu of grace periods.

As further shown in FIG. 12, a barrier mechanism 60 is required in this implementation of the cluster 2 insofar as the absence of a read-copy update subsystem is assumed for this case. The barrier mechanism 60 can be invoked by instructions associated with the updaters $12_1$, $12_2$, $12_3$ and $12_4$, and will operate in synchronization with the cluster-wide grace period detection subcomponent 20b. As persons skilled in the art will appreciate, any number of conventionally known barrier mechanisms could be used for this purpose.

Accordingly, a technique for managing shared mutable data in a clustered data processing system has been disclosed in which updates to the shared data can be performed in a way that does not impact concurrent readers. Advantageously, readers are neither required to obtain locks nor engage in messaging in order to access the data being updated. They can proceed completely unaware that concurrent updates are being performed, thereby greatly improving their performance.

Figure 13:
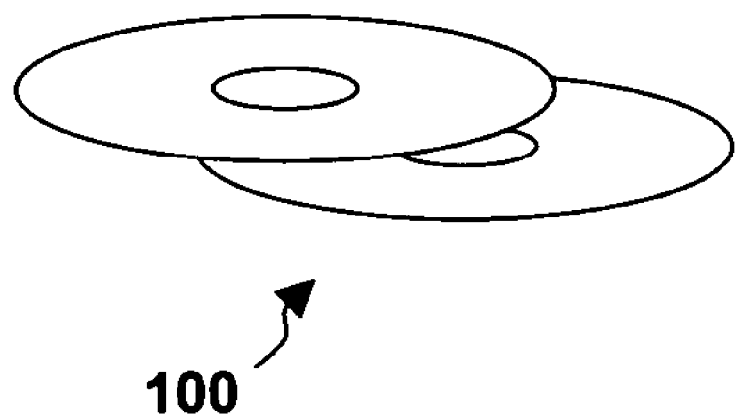
FIG. 13 is a diagrammatic illustration of storage media that can be used to store a computer program product for implementing read-copy update grace period detection functions in accordance with the invention.

It will be appreciated that the foregoing concepts may be variously embodied in any of a data processing system, a machine implemented method, and a computer program product in which programming means are recorded on one or more data storage media for use in controlling a data processing system to perform the required functions. Exemplary data storage media for storing such programming means are shown by reference numeral 100 in FIG. 13. The media 100 are shown as being portable optical storage disks of the type that are conventionally used for commercial software sales. Such media can store the programming means of the invention either alone or in conjunction with an operating system or other software product that incorporates read-copy update functionality. The programming means could also be stored on portable magnetic media (such as floppy disks, flash memory sticks, etc.) or on magnetic media combined with drive systems (e.g. disk drives) incorporated in computer platforms.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for synchronizing data updates to shared mutable data maintained at each node in a clustered data processing system, comprising:

performing a data element update operation on a data element maintained at each node of said clustered data processing system by updating said data element at each node while preserving a pre-update view of said shared mutable data, or perserving an associated operational mode, on behalf of readers that are utilizing said pre-update view or said operational mode, wherein said readers may continue operations without regard to said update operation;

requesting detection of a grace period at each node;

detecting when a cluster-wide grace period has occurred that guarantees a grace period has occurred at each node and said readers will no longer be utilizing said pre-update view or said operational mode; and performing a deferred action associated with said update operation that removes said pre-date view or changes said operational mode following detection of said cluster-wide grace period.

2. The method in accordance with claim 1, wherein said update operation is initially performed at an update-initiating node followed by other nodes in said clustered data processing system.

3. The method in accordance with claim 2, wherein said update-initiating node advises said other nodes of said update.

4. The method in accordance with claim 1, wherein said requesting comprises registering a callback at each node.

5. The method in accordance with claim 1, wherein said cluster-wide grace period detection is performed by an update-initiating node.

6. The method in accordance with claim 5, wherein said cluster-wide grace period detection is performed by said update-initiating node receiving reports from other nodes in said clustered data processing system passing through local grace periods or quiescent states.

7. The method in accordance with claim 1, wherein said cluster-wide grace period detection is performed at all nodes of said clustered data processing system.

8. The method in accordance with claim 7, wherein said cluster-wide grace period detection is performed by each node of said clustered data processing system maintaining a count of nodes passing through local grace periods or quiescent states.

9. The method in accordance with claim 1, wherein said cluster-wide grace period is based on all nodes in said clustered data processing system passing through a local grace period.

10. The method in accordance with claim 1, wherein said cluster-wide grace period is based on all nodes in said clustered data processing system passing through a local quiescent state.

* * * * *